United States Patent
Josan et al.

(10) Patent No.: US 11,109,253 B2
(45) Date of Patent: Aug. 31, 2021

(54) TECHNIQUES TO REDUCE SCELL MEASUREMENTS IN MILLIMETER WAVE FREQUENCY RANGE

(71) Applicant: QUALCOMM Incorporated, San Diego, CA (US)

(72) Inventors: Awlok Josan, San Francisco, CA (US); Valentin Alexandru Gheorghiu, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/449,080

(22) Filed: Jun. 21, 2019

(65) Prior Publication Data

US 2019/0394662 A1 Dec. 26, 2019

Related U.S. Application Data

(60) Provisional application No. 62/689,734, filed on Jun. 25, 2018.

(51) Int. Cl.
*H04W 24/10* (2009.01)

(52) U.S. Cl.
CPC ................. *H04W 24/10* (2013.01)

(58) Field of Classification Search
CPC ...... H04W 24/10; H04W 48/16; H04W 16/28
See application file for complete search history.

(56) References Cited

U.S. PATENT DOCUMENTS

2018/0317114 A1* 11/2018 Kim .................. H04L 1/1685
2018/0359790 A1* 12/2018 Ingale ................ H04W 28/16
(Continued)

FOREIGN PATENT DOCUMENTS

EP 3242509 A1 11/2017

OTHER PUBLICATIONS

Apple Inc: "Discussion on Beam Measurement and Reporting", 3GPP TSG RAN WG1 Meeting #92bis, 3GPP Draft; R1-1804770 Discussion on Beam Measurement and Reporting, 3rd Generation Partnership Project (3GPP), Mobile Competence Centre; 650, Route Des Lucioles; F-06921 Sophia-Antipolis Cedex; FR, vol. RAN WG1, No. Sanya, China; Apr. 16, 2018-Apr. 20, 2018, Apr. 15, 2018 (Apr. 15, 2018), 8 Pages, XP051427037, Retrieved from the Internet: URL: http://www.3gpp.org/ftp/Meetings%5F3GPP%5FSYNC/RAN1/Docs/ [retrieved on Apr. 15, 2018] Chapter 1.
"Introduction" International Search Report and Written Opinion—PCT/US2019/038699—ISA/EPO—dated Sep. 3, 2019.

(Continued)

*Primary Examiner* — Jeffrey M Rutkowski
*Assistant Examiner* — Chae S Lee
(74) *Attorney, Agent, or Firm* — Arent Fox, LLP (57) ABSTRACT

Aspects of the present disclosure provide techniques for the UE to minimize the need to expend resources in conducting signal measurements for SCell by limiting the number of beams that may be scanned and reported back to the network. For example, in instances when the UE has been configured with an active transmission configuration indicator (TCI) state by the network, the UE may be configured to communicate on a limited set of beams (e.g., one beam for transmission (Tx) and another for receiver (Rx)). As such, the UE, during the periodic measurements, may limit the signal measurements to a limited set of beams from all available beams in order to conserve resources based on a determination that the UE is configured with TCI state.

27 Claims, 5 Drawing Sheets

(56) References Cited

U.S. PATENT DOCUMENTS

| | | | |
|---|---|---|---|
| 2019/0132066 A1* | 5/2019 | Park | H04W 16/28 |
| 2019/0150161 A1* | 5/2019 | Cheng | H04L 5/0032 370/330 |
| 2019/0253941 A1* | 8/2019 | Cirik | H04W 36/0072 |

OTHER PUBLICATIONS

Nokia, et al., "On Beam Grouping and Reporting", 3GPP TSG-RAN WG1 Meeting #89, 3GPP Draft; R1-1708907, 3rd Generation Partnership Project (3GPP), Mobile Competence Centre; 650, Route Des Lucioles; F-06921 Sophia-Antipolis Cedex, France, vol. RAN WG1, No. Hangzhou; May 15, 2017-May 19, 2017, May 14, 2017 (May 14, 2017), 12 Pages, XP051274085, Retrieved from the Internet URL: http://www.3gpp.org/ftp/Meetings_3GPP_SYNC/RAN1/Docs/ [retrieved on May 14, 2017] p. 4, line 1—p. 5, line 10, figures 1, 2.

Samsung: "Discussion on Beam Measurement for 5G New Radio Interface in mmWave Frequency Bands", 3GPP TSG RAN WG2 #94, 3GPP Draft; R2-163652, 3rd Generation Partnership Project (3GPP), Mobile Competence Centre; 650, Route Des Lucioles; F-06921 Sophia-Antipolis Cedex; France, vol. Ran WG2, No. Nanjing, China; May 23, 2016-May 27, 2016, May 22, 2016 (May 22, 2016), XP051105081, pp. 1-4, Retrieved from the Internet: URL: http://www.3gpp.org/ftp/Meetings_3GPP_SYNC/RAN2/Docs/ [retrieved on May 24, 2016], Chapter 2, General Aspects of Beam Measurement.

ZTE., et al., "Details and Evaluation Results on Beam Indication", 3GPP TSG RAN WG1 Meeting #91, 3GPP Draft; R1-1719538 Details and Evaluation Results on Beam Indication, 3rd Generation Partnership Project (3GPP), Mobile Competence Centre, 650, Route Des Lucioles; F-06921 Sophia-Antipolis Cedex, France, vol. RAN WG1,No. Reno, USA; Nov. 27, 2017-Dec. 1, 2017, Nov. 18, 2017 (Nov. 18, 2017), 11 Pages, XP051369352, Retrieved from the Internet URL: http://www.3gpp.org/ftp/tsg%5Fran/WG1%5FRL1/TSGR1%5F91/Docs/ [retrieved on Nov. 18, 2017], Sections 1 to 5.

* cited by examiner

TECHNIQUES TO REDUCE SCELL MEASUREMENTS IN MILLIMETER WAVE FREQUENCY RANGE

CLAIM OF PRIORITY UNDER 35 U.S.C. § 119

This application claims priority to U.S. Provisional Application No. 62/689,734 titled "TECHNIQUES TO REDUCE SCELL MEASUREMENTS IN MILLIMETER WAVE FREQUENCY RANGE," filed Jun. 25, 2018, which is assigned to the assignee hereof, and incorporated herein by reference in its entirety.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, long term evolution (LTE) and 5G new radio (5G NR) communications technology expand and support diverse usage scenarios and applications with respect to current mobile network generations.

Both LTE and 5G NR communication technologies support carrier aggregation (CA) where a user equipment (UE) can communicate with one or more cells using a plurality of aggregated component carriers (CCs) to improve efficiency in receiving/transmitting wireless communications. In CA, the UE may establish an initial connection with a primary cell (PCell) for communication in a wireless network. The network may then configure one or more additional radio bearers for the UE to support additional CCs with one or more secondary cells (SCell). Instructions to activate and/or deactivate the additional aggregated CC with an SCell over an additional radio bearer are received by the network from the SCell itself. Generally, the network may activate the SCell when the need for the additional aggregated CC arises such as when high data throughput is needed or low latency is required for communication.

However, even in the deactivated state, the network may periodically request the UE to measure the SCell signals and report back the measured metrics in order to allow the network to properly manage load distribution. The UE performs the measurements by performing a UE receiver (Rx) beam sweep on a plurality of available beams between the base station and the UE to identify the beam with the strongest measurements. The beam sweep process, however, may be resource intensive with respect to UE power consumption and further exasperated by repeating the measurements for each beam.

SUMMARY

Aspects of the present disclosure provide techniques for the UE to minimize the need to expend resources in conducting signal measurements for SCell by limiting the number of beams that may be scanned and reported back to the network. For example, in instances when the UE has been configured with transmission configuration indicator (TCI) state by the network, the UE may be configured to communicate on a limited set of beams (e.g., one beam for transmission (Tx) and another for receiver (Rx)). As such, the UE, during the periodic measurements, may limit the signal measurements to a limited set of beams from all available beams in order to conserve resources based on a determination that the UE is configured with TCI state. Further, prior to reporting the new measurements to the network, the UE may also compare the new measurements of the limited set of beams with the previously reported measurements to determine whether the difference between the new measurements and the previously reported measurements (e.g., delta value) falls beyond a threshold. In the instance, that the delta value falls within the threshold, the UE may elect against reporting the new measurements to the network, and thereby conserve further resources associated with transmitting measurement information.

However, if the UE determines that the new measurements compared against the previously reported measurements fall beyond the threshold, the UE may further determine whether the previously conducted beam sweep (e.g., measurements of all available beams) was performed within a period of time threshold. In other words, the UE may determine whether the reported measurements are stale. If the time since last beam sweep was performed exceeds the period of time threshold, the UE may initiate measurements of all UE Rx beams by doing a beam sweep, and report the updated measurements to the network. However, if the time since the last beam sweep was performed is less than the period of time threshold, the UE may perform new measurements on only the beam for which the UE last reported measurements. If the new measurements for the last reported beam are less than the threshold, the UE may elect not to report the new measurements. However, if the new measurements for the last reported beam are greater than the threshold, the UE may conduct measurements across all UE Rx beams by performing a beam sweep and provide a measurement report to the network to update the measurements.

In one example, a method for wireless communication is disclosed. The method may include receiving, at a UE, a request from a network to perform signal measurements for a plurality of beams associated with a SCell. The method may further include measuring, in response to the request, a signal quality for at least one beam from the plurality of beams associated with the SCell to generate a current measurement metric. The method may further include determining whether a difference between the current measurement metric and the previous measurement metric for the at least one beam satisfies a threshold. The method may further include configuring the UE to either enable or disable measurement reporting based on the determining.

The method may further include determining that the UE is configured with at least one TCI state that identifies the at least one beam from the plurality of beams. In an aspect, the at least one beam from the plurality of beams includes a beam configured for a previously activated TCI state. In another aspect, the TCI state identifies only one beam from the plurality of beams for the UE to utilize for communication on the SCell.

In an aspect of the method, configuring the UE to either enable or disable the measurement reporting based on the determining, includes: disabling the measurement reporting based on determining that the difference between the current measurement metric and the previous measurement metric for the at least one beam is less than the threshold, wherein disabling the measurement reporting includes omitting reporting the current measurement metric for the at least one beam to the network.

In an aspect of the method, configuring the UE to either enable or disable the measurement reporting based on the determining, includes enabling the measurement reporting based on determining that the difference between the current measurement metric and the previous measurement metric for the at least one beam is greater than the threshold. The method may further include measuring the signal quality for each of the plurality of beams associated with the SCell using a beam sweep. The method may further include reporting measurement metrics associated with each of the plurality of beams to the network.

In another aspect, the method may further include determining, in response to the request, whether a length of time since the UE previously performed signal measurements for the plurality of beams associated with SCell exceeds a period of time threshold. The method may further include measuring the signal quality for each of the plurality of beams associated with the SCell using beam sweep based on the determining that the length of time since the UE previously performed the signal measurements exceeds the period of time threshold; and reporting measurement metrics associated with each of the plurality of beams to the network. In an aspect, the period of time threshold is a number of periodic measurement cycles.

In another example, an apparatus for wireless communications is disclosed. The apparatus may include a memory configured to store instructions, and a processor communicatively coupled with the memory. The processor may be configured to execute the instructions to receive, at a UE, a request from a network to perform signal measurements for a plurality of beams associated with a SCell. The processor may further be configured to execute the instructions to measure, in response to the measurement request, a signal quality for at least one beam from the plurality of beams associated with the SCell to generate a new measurement metric. The processor may further be configured to execute the instructions to determine whether a difference between the current measurement metric and the previous measurement metric for the at least one beam satisfies a threshold. The processor may further be configured to execute the instructions to configure the UE to either enable or disable measurement reporting based on the determining.

In another example, a computer readable medium for wireless communications is disclosed. The computer readable medium may include code for receiving, at a UE, a request from a network to perform signal measurements for a plurality of beams associated with a SCell. The computer readable medium may further include code for measuring, in response to the request, a signal quality for at least one beam from the plurality of beams associated with the SCell to generate a new measurement metric. The computer readable medium may further include code for determining whether a difference between the current measurement metric and the previous measurement metric for the at least one beam satisfies a threshold. The computer readable medium may further include code for configuring the UE to either enable or disable measurement reporting based on the determining.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

As discussed above, both LTE and 5G NR communication technologies may support carrier aggregation (CA) where a user equipment (UE) can communicate with one or more cells using a plurality of aggregated component carriers (CCs) to improve efficiency in receiving/transmitting wireless communications. In CA, the UE may establish an initial connection with a primary cell (PCell) for communication in a wireless network. The network may then configure one or more additional radio bearers for the UE to support additional CCs with one or more secondary cells (SCell).

Generally, even in the deactivated state, the network may periodically request the UE to measure the SCell signals and report back the measured metrics in order to allow the network to properly manage load distribution. The UE performs the measurements by conducting a UE Rx beam sweep on a plurality of available beams between the base station and the UE to identify the beam with the strongest measurements. The beam sweep process, however, may be resource intensive with respect to UE power consumption.

Aspects of the present disclosure provide techniques for the UE to minimize the need to expend resources in conducting signal measurements for SCell by limiting the number of beams that may be scanned and reported back to the network. For example, in instances when the UE has been configured with transmission configuration indicator (TCI) state by the network, the UE may be configured to communicate on a limited set of beams (e.g., one beam for transmission (Tx) of control and data for uplink and another for receiver (Rx) for control and data on downlink). It should be appreciated that in some examples, the UE may be configured with more than one TCI state. In such instance, for each TCI state, the UE may be configured to communicate using a different set of one or more beams. For example, the UE may be configured with a first TCI state identifying a first set of beams and also a second TCI state identifying a second set of beams. In such instance, the UE may monitor the beams based on the TCI configurations. As such, the UE, during the periodic measurements, may limit the signal measurements to a limited set of beams from all available beams in order to conserve resources based on a determination that the UE is configured with the TCI state. Further, prior to reporting the new measurements to the network, the UE may also compare the new measurements of the limited set of beams with the previously reported measurements to determine whether the difference between the new measurements and the previously reported measurements (e.g., delta value) falls beyond a threshold. In the instance that the delta value falls within the threshold, the UE may elect against reporting the new measurements to the network, and thereby conserve further resources associated with transmitting measurement information.

However, if the UE determines that the new measurements compared against the previously reported measurements fall beyond the threshold, the UE may further determine whether the previously conducted beam sweep (e.g., measurements of all available beams) was performed within a predetermined time period threshold. In other words, the UE may determine whether the reported measurements are stale. If the time since last beam sweep was performed exceeds the predetermined time period threshold, the UE may initiate measurements all UE Rx beams by doing a beam sweep, and report the updated measurements to the network. However, if the time since last beam sweep was performed is less than the predetermined time period threshold, the UE may perform new measurements on only the beam for which the UE last reported measurements. If a difference between the new measurements for the last reported beam sweep and the previously reported measurements are less than the threshold, the UE may elect not to report the new measurements. However, if the difference between the new measurements for the last reported beam sweep and the previously reported measurements are greater than the threshold, the UE may conduct measurements across all UE Rx beams by performing a beam sweep and provide measurement report to the network to update the measurements.

Various aspects are now described in more detail with reference to the FIGS. 1-4. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
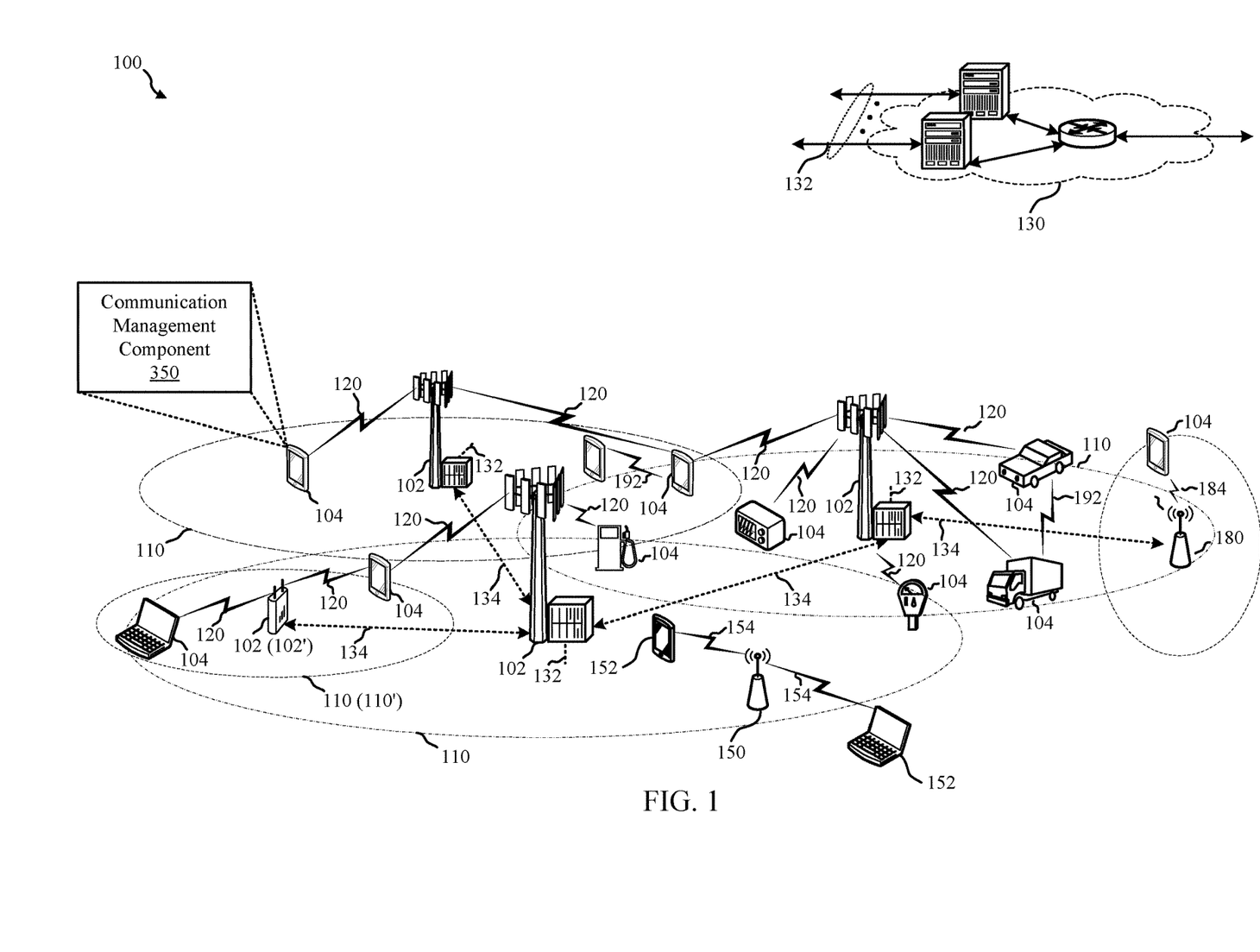
FIG. 1 illustrates an example of a wireless communications system in accordance with aspects of the present disclosure.

FIG. 1 is a diagram illustrating an example of a wireless communications system and an access network 100. The wireless communications system (also referred to as a wireless wide area network (WWAN)) includes base stations 102, UEs 104, and a core network 130 such as an Evolved Packet Core (EPC) or 5G core (5GC). In some examples, the core network 130 that may provide user authentication, access authorization, tracking, internet protocol (IP) connectivity, and other access, routing, or mobility functions.

The core network 130 may allow circuit-switched connectivity to the back-end operator network (e.g., public land mobile network (PLMN) and/or packet-switched connectivity to private networks, operator's intranet or to the public internet.

In an aspect, one or more of the UEs 104 may include a communication management component 350 that reduces measurements of SCells in certain scenarios. The reduction in measurements may save UE power, for example, when the UE is in a sleep mode. As discussed in further detail below with respect to FIG. 3, the communication management component 350 may include a TCI configuration component 355 that determines an active TCI state of the UE 104, a measurement metrics component 360 that compares current and previous measurement metrics, and a reporting configuration component 370 that determines whether to send a measurement report. Although the following description may be focused on 5G NR, the concepts described herein may be applicable to other similar areas, such as LTE, LTE-A, CDMA, GSM, and other wireless technologies.

The base stations 102 may include macro cells (high power cellular base station) and/or small cell base stations (low power cellular base station). The base stations 102 (collectively referred to as Evolved Universal Mobile Telecommunications System (UMTS) Terrestrial Radio Access Network (E-UTRAN)) interface with the core network 130 (e.g., an EPC or 5GC) through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the core network 130) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell base station 102' may have a coverage area 110' that overlaps the coverage area 110 of one or more macro cell base stations 102. A network that includes both small cell base stations and macro cell base stations may be known as a heterogeneous network. A heterogeneous network may also include Home Evolved Node Base Stations (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ NR and use the same 5 GHz unlicensed frequency spectrum as used by the Wi-Fi AP 150. The small cell base station 102', employing NR in an unlicensed frequency spectrum, may boost coverage to and/or increase capacity of the access network.

A gNodeB (gNB) or eNodeB (eNB) 180 (one or both of gNB and eNB may also be referred to as "base station") may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. It should be appreciated by those of ordinary skill in the art that the present invention is not just limited to mmW, but may also include any other frequencies used for wireless communication. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. In an aspect, a gNB 180 operating using mmW may utilize beamforming 184 with the UE 104 to compensate for the extremely high path loss and short range. Additionally, UEs 104 performing D2D communications may operate using mmW and may also utilize beamforming 184.

The EPC may include a Mobility Management Entity (MME), other MMEs, a Serving Gateway, a Multimedia Broadcast Multicast Service (MBMS) Gateway, a Broadcast Multicast Service Center (BM-SC), and a Packet Data Network (PDN) Gateway. The MME may be in communication with a Home Subscriber Server (HSS). The MME is the control node that processes the signaling between the UEs 104 and the EPC. Generally, the MME provides bearer and connection management. All user Internet protocol (IP) packets are transferred through the Serving Gateway, which itself is connected to the PDN Gateway. The PDN Gateway provides UE IP address allocation as well as other functions. The PDN Gateway and the BM-SC are connected to the IP Services. The IP Services may include the Internet, an intranet, an IP Multimedia Subsystem (IMS), a PS Streaming Service, and/or other IP services. The BM-SC may provide functions for MBMS user service provisioning and delivery. The BM-SC may serve as an entry point for content provider MBMS transmission, may be used to authorize and initiate MBMS Bearer Services within a public land mobile network (PLMN), and may be used to schedule MBMS transmissions. The MBMS Gateway may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the core network 130 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In some examples, the wireless communication system may be a mmW communication system. In mmW communication systems (e.g., access network 100), a line of sight (LOS) may be needed between a transmitting device (e.g., base station 102) and a receiving device (e.g., UE 104), or between two UEs 104. Frequency is very high in mmW communication systems which means that beam widths are very small, as the beam widths are inversely proportional to the frequency of the waves or carriers transmitted by an antenna of the transmitting device. Beam widths used in mmW communications are often termed as "pencil beams." The small wavelengths may result in many objects or materials acting as obstacles including even oxygen molecules. Therefore, LOS between the transmitter and receiver may be required unless a reflected path is strong enough to transmit data. Further, in some examples, base stations may track UEs 104 to focus beams for communication.

During LOS situations, tracking of the UE 104 may be performed by the base station 102 or another UE 104 by focusing a beam onto the tracked UE 104. However, if the receiving UE 104 is in a Non-Line of Sight (NLOS) position, then a transmitter of the base station 102 may need to search for a strong reflected path which is not always available. An example of a UE 104 being in a NLOS position may include a first UE 104 located within a vehicle. When the first UE 104 is located within the vehicle, a base station 102 may have difficulty retaining LOS and the difficulty of retaining LOS may further increase when the vehicle is moving.

Further, compared to lower frequency communication systems, a distance between base stations 102 in a mmW communication system may be very short (e.g., 150-200 meters between gNBs). The short distances may result in a short amount of time required for a handover between base stations 102. The short distance and the fast handovers may cause difficulty to the base station 102 in maintaining a LOS beam on a UE 104 when the UE 104 is, for example, located within a vehicle as even small obstacles like a user's finger on the UE 104 or the vehicle windows or windshield act as obstacles to maintaining the LOS.

Figure 2A:
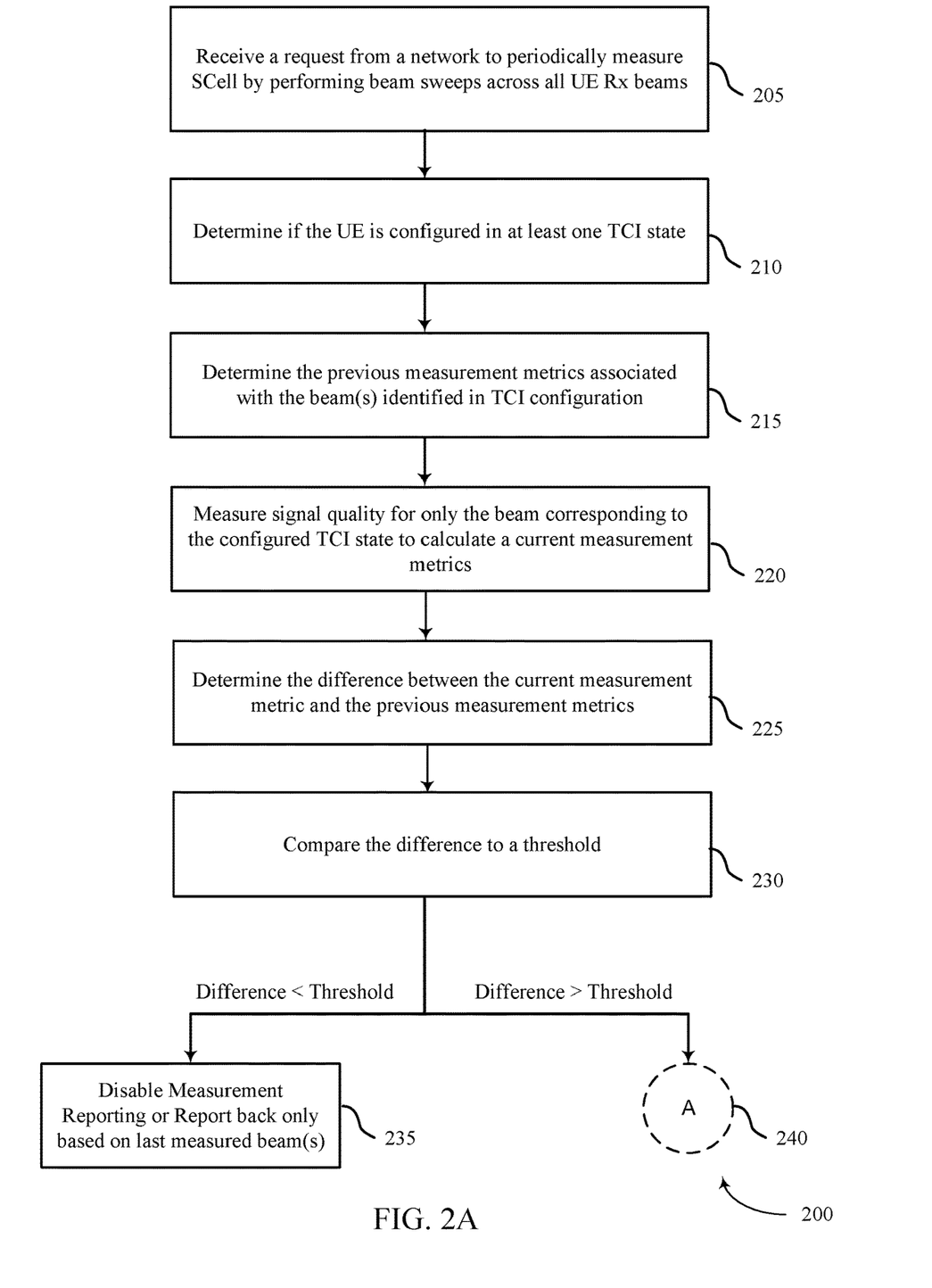
FIGS. 2A and 2B illustrate examples of a flowchart of methods executed by the UE in accordance with aspects of the present disclosure.
Figure 2B:
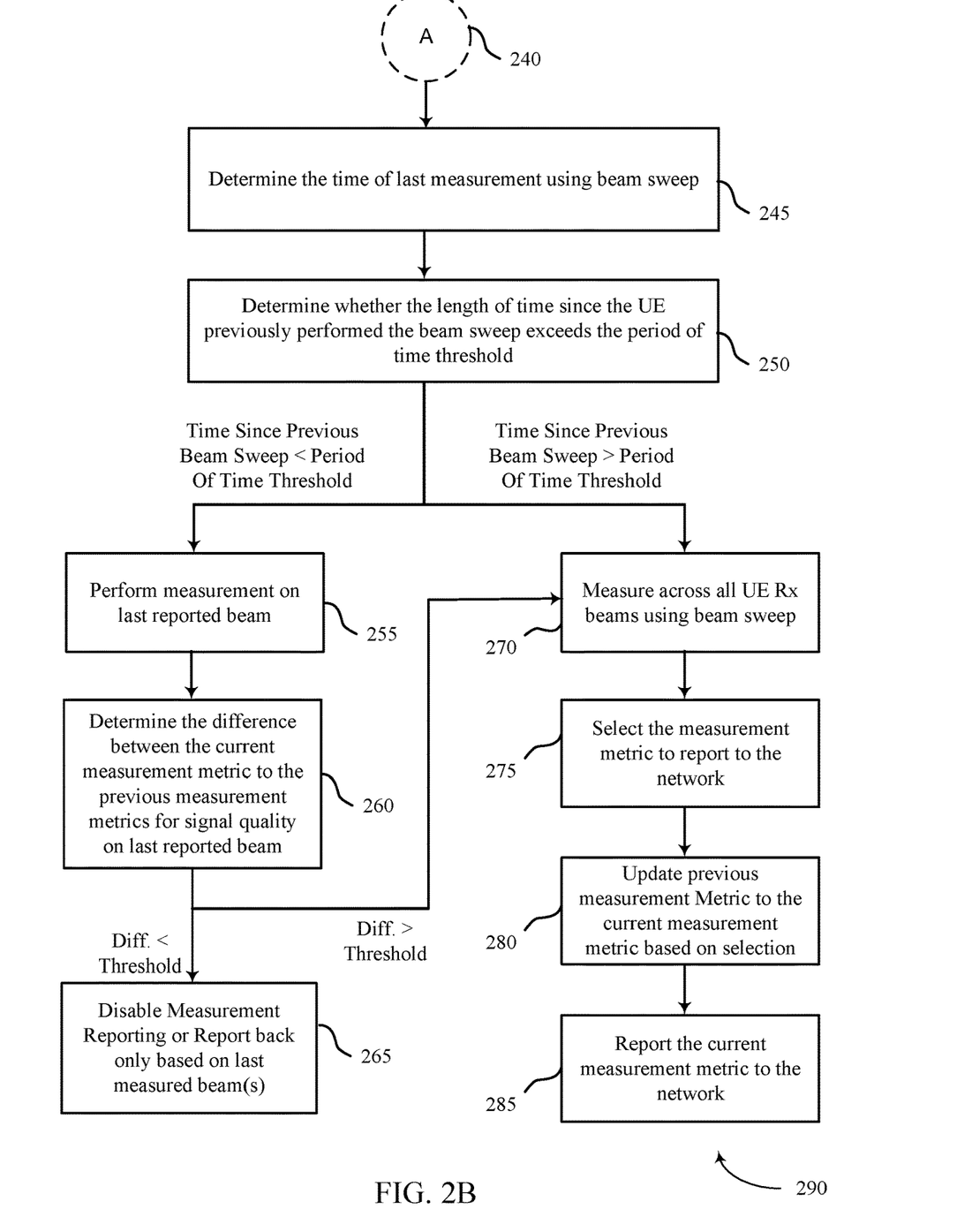

FIGS. 2A and 2B illustrate flowcharts 200 and 290 of methods executed by the UE 104 in accordance with aspects of the present disclosure. As discussed below, although flowchart 290 in FIG. 2B is illustrated as a continuation of flowchart 200 in FIG. 2A, it should be appreciated that methods of flowcharts 200 and 290 may be executed either independently (e.g., flowchart 290 may start at block 245 without first requiring the UE to execute the steps of blocks 205-240 outlined in flowchart 200) or as a continuation of flowchart 200.

At block 205, the method may include receiving a request from the network to periodically measure one or more SCells by performing beam sweeps across all UE Rx beams. In some examples, the SCell may be deactivated during the time the UE receives the request from the network. However, the SCell may be activated when the need arises, including in instances of high data throughput and/or low latency requirements. Generally, performing beam sweeps across all UE Rx beams and reporting measurement metrics (e.g., reference signal received power (RSRP)/reference signal received quality (RSRQ)/reference signal—signal to interference plus noise ratio (RS-SINR)) to the network may enable the network to better manage load balancing of the network. Additionally, because the UE 104 has performed beam sweeps across all UE Rx beams, the UE 104 may store the recent timing information from a target cell and thereby enable fast activation of the SCell, if needed. However, as noted above, the process of performing the periodic beam sweeps may be resource intensive.

To minimize resource waste, the UE 104, at block 210 may determine if the UE is configured in at least one active TCI state. In some examples, the UE may be configured in at least one TCI state because the network may have previously activated the UE for communication with an SCell. As such, during such activation, the network may have provided the UE TCI configuration information that identifies one or more limited beams for the UE to utilize for uplink and downlink communication. For example, the network may configure the UE 104 with a TCI configuration information via an RRC configuration. In some examples, the UE may be configured with more than one TCI configuration information. The UE 104, however, may be configured with a single active TCI configuration, which may be selected by the network via RRC, MAC-CE, or DCI.

At block 215, if the UE has been configured in at least one active TCI state, the UE may determine the previous measurement metrics associated with the beam(s) identified in the TCI configuration. Generally, there may be a single beam identified for uplink transmission and a separate beam identified for downlink communication. In other examples, the UE may be configured with only a single beam for both uplink and downlink communication.

At block 220, the UE may measure the signal quality for only the beam corresponding to the configured TCI state to calculate a current measurement metric. At block 225, the UE may further calculate the difference (or change/delta) between the current measurement metric to the previous measurement metrics. At block 230, the UE may compare the difference to a threshold.

If the difference between the current measurement metric and the previous measurement metrics is less than the threshold, the UE, at block 235 may disable measurement reporting for the UE or report back to the network only the signal quality metrics based on the last measured beam(s). Disabling measurement reporting may include electing not to respond to the request from the network for the UE to perform beam sweeps across all UE Rx beams and/or provide measurement reports to the network.

However, if difference between the current measurement metric and the previous measurement metrics is greater than the threshold, the UE 104, at block 240 may either enable measurement reporting which includes performing measurements across all UE Rx beams using beam sweep, or in the alternative continuing to the steps outlined in flowchart 290 of FIG. 2B for further analysis as to whether to enable or disable measurement reporting.

Turning next to FIG. 2B, flowchart 290 may be a continuation of the flowchart 200 of FIG. 2A. For example, once the UE determines that the difference between the current measurement metrics for the beam identified in the TCI configuration exceeds the threshold, the method may proceed to block 245 discussed below. However, it is not necessary that steps outlined in blocks 210-240 precede those outlined in flowchart 290. Specifically, it is contemplated that upon receiving a request to perform measurements for SCell from the network (block 205), the UE may directly proceed to block 245 by foregoing blocks 210-240.

At block 245, the UE may determine the time since the last measurement was performed across all UE Rx beams by beam sweep. At block 250, the UE may determine whether the length of time since the UE previously performed the beam sweep exceeds the period of time threshold. The period of time threshold may be a period of time after which a previous measurement is considered stale. The period of time threshold may be configured by the network or specified in a standards document or regulation. In an aspect, the period of time threshold may be defined as a number of measurement cycles (e.g., a number of periodic measurements for which the UE is configured). For example, the period of time threshold may be defined as 10, 20, or another number of measurement cycles.

If the time since the previous beam sweep is less than the period of time threshold, the UE, at block 255 may perform measurement on only the last reported beam because the last reported beam would generally be associated with the strongest signal quality. At block 260, the UE 104 may determine the difference between the current measurement metric and the previous measurement metrics for signal quality on the last reported beam. The UE 104 may determine whether the difference satisfies the threshold.

If, the difference between the current measurement metric and the previous measurement metrics for the last reported beam is less than the threshold, the UE 104, at block 265 may disable measurement reporting (e.g., electing to omit transmitting the current measurement reports) or report back to the network only the signal quality metrics based on the last measured beam(s) (e.g., the current measurement metric). However, if the difference between the current measurement metric and the previous measurement metrics for the last reported beam is greater than the threshold, the UE 104, at block 270 may proceed to measure signal quality across all UE Rx beams using beam sweep.

At block 275, the UE 104 may select the measurement metric to report to the network. Specifically, because the UE may have signal quality information associated with all Rx beams, the UE may select the beam corresponding to the strongest signal quality (e.g., least SNR). At block 280, the UE may update the previous measurement metric to the current measurement metric based on the selection of the beam. At block 285, the UE may report the current measurement metric (e.g., updated measurement) to the network.

Figure 3:
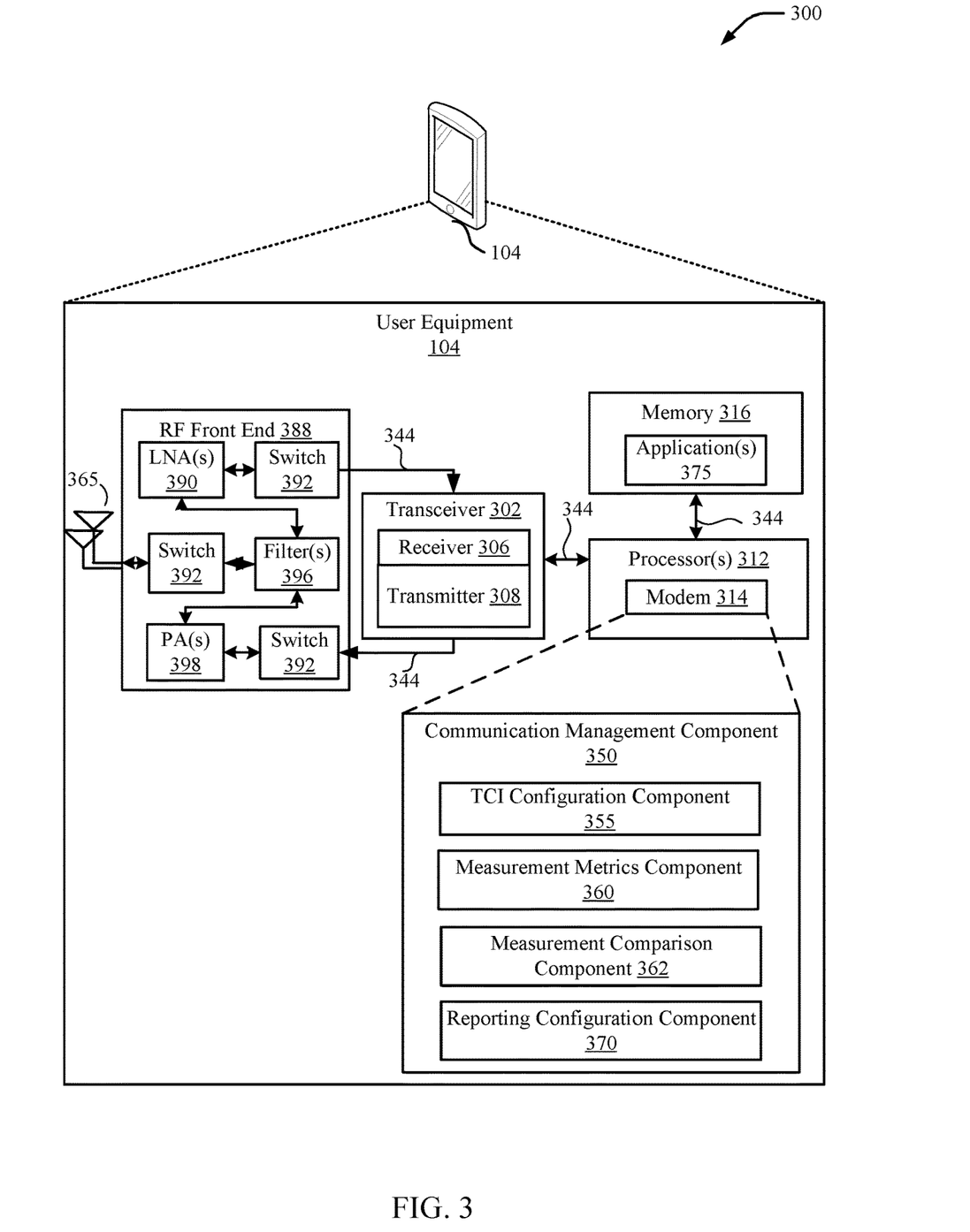
FIG. 3 illustrates an example of a schematic diagram of an aspect of an implementation of various components of a UE in accordance with various aspects of the present disclosure.

FIG. 3 illustrates example hardware components and subcomponents of a device that may be a UE 104 for implementing one or more methods (e.g., method 400) described herein in accordance with various aspects of the present disclosure. For example, one example of an implementation of the UE 104 may include a variety of components, some of which have already been described above, but including components such as one or more processors 312, memory 316 and transceiver 302 in communication via one or more buses 344, which may operate in conjunction with the communication management component 350 to perform functions described herein related to including one or more methods (e.g., 400) of the present disclosure.

The one or more processors 312, modem 314, memory 316, transceiver 302, RF front end 388 and one or more antennas 365, may be configured to support voice and/or data calls (simultaneously or non-simultaneously) in one or more radio access technologies. In an aspect, the one or more processors 312 can include a modem 314 that uses one or more modem processors. The various functions related to communication management component 350 may be included in modem 314 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 314 associated with communication management component 350 may be performed by transceiver 302.

The memory 316 may be configured to store data used herein and/or local versions of application(s) 375 or communication management component 350 and/or one or more of its subcomponents being executed by at least one processor 312. The memory 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, the memory 316 may be a non-transitory computer-readable storage medium that stores one or more computer-executable codes defining communication management component 350 and/or one or more of its subcomponents, and/or data associated therewith, when the UE 104 is operating at least one processor 312 to execute communication management component 350 and/or one or more of its subcomponents.

The communication management component 350 may include a TCI configuration component 355 to determine whether the UE 104 is configured with one or more TCI states and includes one or more Tx and Rx beams for communication from prior SCell activation. The TCI configuration component 355 may receive a TCI configuration from the network as an RRC message indicating one or more TCI state a and the one or more Tx and Rx beams for communication in each respective TCI state. The TCI configuration component 355 may store the TCI configuration (e.g., in memory 316). The TCI configuration component 355 may receive a TCI activation from the network as an RRC message, MAC-CE, or DCI and select a corresponding configured TCI state for activation. That is, the TCI configuration component 355 may indicate the one or more Tx and Rx beams corresponding to the active TCI state for communications. The TCI configuration component 355 may store an indication of the most recent active TCI state. When the communication management component 350 receives a request from the network to perform signal measurements, the communication management component 350 may determine the stored most recent active TCI state and the Tx and Rx beams corresponding to the TCI state. Accordingly, the TCI configuration component 355 may determine that the UE is configured with at least one activated TCI state that identifies the at least one beam from the plurality of beams for measurement.

The communication management component 350 may further include measurement metrics component 360 for measuring signal quality for one or more Rx beams to identify one or more of measurement metrics (e.g., RSRP, RSRQ, RS-SINR, etc.) For example, the measurement metrics component 360 may include or control the receiver 306 to measure the signal quality of the one or more Rx beams to identify the one or more of measurement metrics. For example, the measurement metrics component 360 may tune the receiver 306 to the Rx beam, measure a reference signal, and calculate the one or more measurement metrics. The measurement metrics component 360 may store (e.g., in memory 316) each measurement metric for comparison to later measurement metrics. Accordingly, when the communication management component 350 receives a request from the network to perform signal measurements, the measurement metrics component 360 may identify the one or more current measurement metrics.

The communication management component 350 may further include measurement comparison component 362 for determining whether there have been any changes in signal quality since the UE last reported the measurement metrics for the measured beam. For example, the measurement comparison component 362 may compare the current measurement metrics to the stored measurement metrics. For instance, the measurement comparison component 362 may determine a difference between the current measurement metric and the last reported measurement metric for the Rx beam. The measurement comparison component 362 may compare the difference to the threshold to determine whether there have been any changes in signal quality since the UE last reported the measurement metrics for the measured beam.

The communication management component 350 may further include reporting configuration component 370 to enable or disable measurement reporting based on one or more factors identified herein. For example, the reporting configuration component 370 may receive the difference between the current measurement metric and the last reported measurement metric or an indication of whether the difference satisfies the threshold from the measurement metrics component 360. In an aspect, the reporting configuration component 370 may disable the measurement reporting in respond to determining that the difference between the current measurement metric and the previous measurement metric for the at least one beam is less than the threshold. In contrast, the reporting configuration component 370 may enable the measurement reporting in response to determining that the difference between the current measurement metric and the previous measurement metric for the at least one beam is greater than the threshold. In another aspect, the reporting configuration component 370 may determine whether a length of time since the UE previously performed signal measurements for the plurality of beams associated with SCell exceeds a period of time threshold. The reporting configuration component 370 may enable the measurement reporting in respond to determining that length of time since the UE previously performed signal measurements for the plurality of beams associated with SCell exceeds a period of time threshold. The reporting configuration component 370 may disable the measurement reporting in respond to determining that length of time since the UE previously performed signal measurements for the plurality of beams associated with SCell is less than the period of time threshold.

The transceiver 302 may include at least one receiver 306 and at least one transmitter 308. The receiver 306 may include hardware, firmware, and/or software code executable by a processor for receiving data, the code comprising instructions and being stored in a memory (e.g., computer-readable medium). The receiver 306 may be, for example, a radio frequency (RF) receiver. In an aspect, the receiver 306 may receive signals transmitted by at least one UE 104. Additionally, receiver 306 may process such received signals, and also may obtain measurements of the signals, such as, but not limited to, Ec/Io, SNR, RSRP, RSSI, etc. The transmitter 308 may include hardware, firmware, and/or software code executable by a processor for transmitting data, the code comprising instructions and being stored in a memory (e.g., computer-readable medium). A suitable example of the transmitter 308 may including, but is not limited to, an RF transmitter.

Moreover, in an aspect, transmitting device may include the RF front end 388, which may operate in communication with one or more antennas 365 and transceiver 302 for receiving and transmitting radio transmissions, for example, wireless communications transmitted by at least one base station 102 or wireless transmissions transmitted by UE 104. The RF front end 388 may be connected to one or more antennas 365 and can include one or more low-noise amplifiers (LNAs) 390, one or more switches 392, one or more power amplifiers (PAs) 398, and one or more filters 396 for transmitting and receiving RF signals.

In an aspect, the LNA 390 can amplify a received signal at a desired output level. In an aspect, each LNA 390 may have a specified minimum and maximum gain values. In an aspect, the RF front end 388 may use one or more switches 392 to select a particular LNA 390 and its specified gain value based on a desired gain value for a particular application.

Further, for example, one or more PA(s) 398 may be used by the RF front end 388 to amplify a signal for an RF output at a desired output power level. In an aspect, each PA 398 may have specified minimum and maximum gain values. In an aspect, the RF front end 388 may use one or more switches 392 to select a particular PA 398 and its specified gain value based on a desired gain value for a particular application.

Also, for example, one or more filters 396 can be used by the RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, the RF front end 388 can use one or more switches 392 to select a transmit or receive path using a specified filter 396, LNA 390, and/or PA 398, based on a configuration as specified by the transceiver 302 and/or processor 312.

As such, the transceiver 302 may be configured to transmit and receive wireless signals through one or more antennas 365 via the RF front end 388. In an aspect, the transceiver 302 may be tuned to operate at specified frequencies such that transmitting device can communicate with, for example, one or more base stations 102 or one or more cells associated with one or more base stations 102. In an aspect, for example, the modem 314 can configure the transceiver 302 to operate at a specified frequency and power level based on the configuration of the transmitting device and the communication protocol used by the modem 314.

In an aspect, the modem 314 can be a multiband-multi-mode modem, which can process digital data and communicate with the transceiver 302 such that the digital data is sent and received using the transceiver 302. In an aspect, the modem 314 can be multiband and be configured to support multiple frequency bands for a specific communications protocol. In an aspect, the modem 314 can be multimode and be configured to support multiple operating networks and communications protocols. In an aspect, the modem 314 can control one or more components of transmitting device (e.g., RF front end 388, transceiver 302) to enable transmission and/or reception of signals from the network based on a specified modem configuration. In an aspect, the modem configuration can be based on the mode of the modem 314 and the frequency band in use. In another aspect, the modem configuration can be based on UE configuration information associated with transmitting device as provided by the network during cell selection and/or cell reselection.

Figure 4:
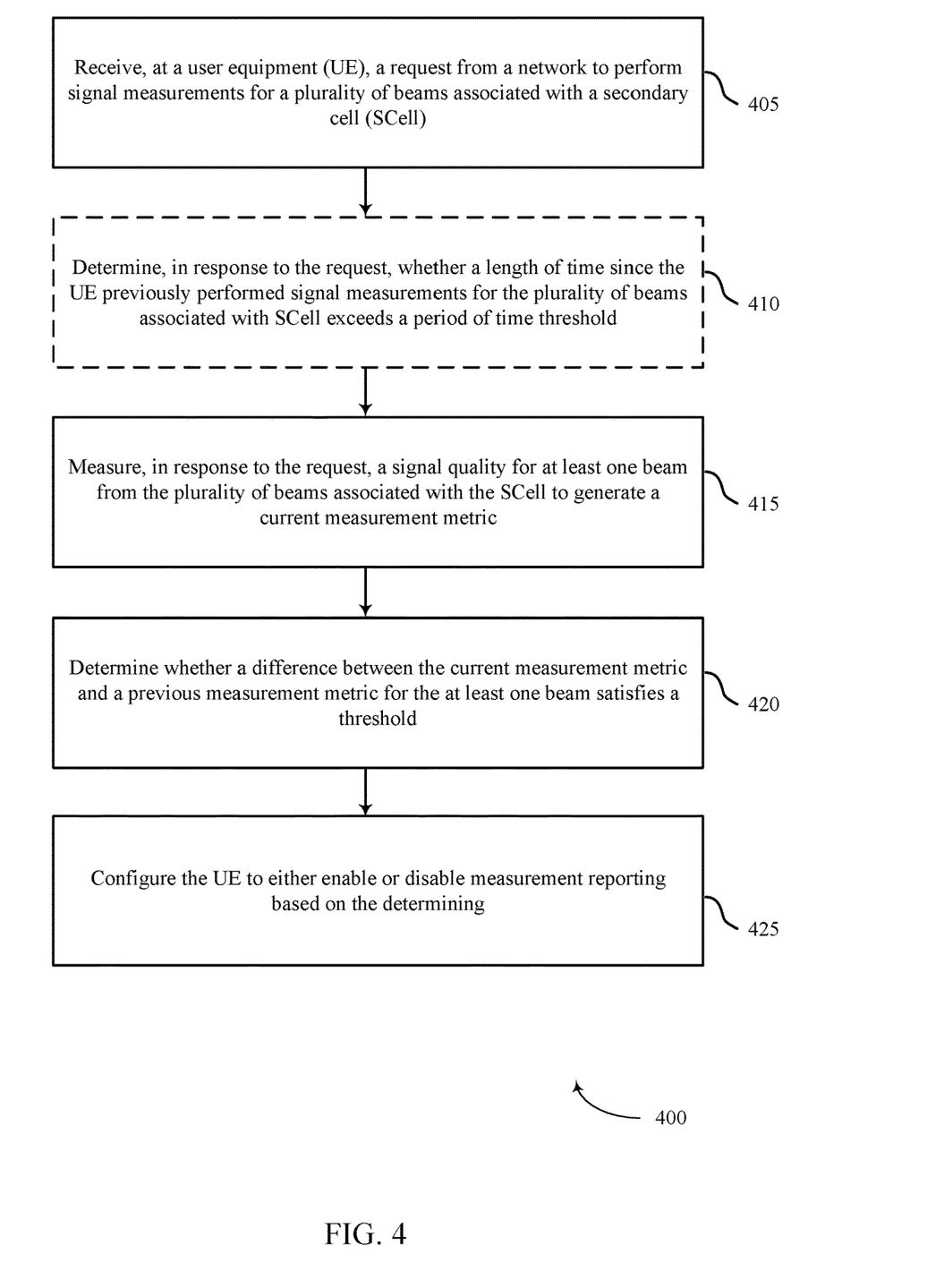
FIG. 4 illustrates an example of a method of wireless communication implemented by the UE in accordance with aspects of the present disclosure.

FIG. 4 is a flowchart of an example method 400 for wireless communications in accordance with aspects of the present disclosure. The method 400 may be performed using the UE 104. Although the method 400 is described below with respect to the elements of the UE 104, other components may be used to implement one or more of the steps described herein.

At block 405, the method 400 may include receiving, at a UE, a request from a network to perform signal measurements for a plurality of beams associated with a SCell. Aspects of block 405 may be performed by transceiver 302 described with reference to FIG. 3. For example, the request may be an RRC message including a measurement object for the SCell. Thus, the UE 104, the processor 312, and/or the modem 314 controlling the transceiver 302 or one of its subcomponents may define means for receiving, at UE, a request from a network to perform signal measurements for a plurality of beams associated with a SCell.

At block 410, the method 400 may optionally include determining, in response to the request, whether a length of time since the UE previously performed signal measurements for the plurality of beams associated with SCell exceeds a period of time threshold. In some aspects, the method may include measuring the signal quality for each of the plurality of beams associated with the SCell using a beam sweep if the length of time since the UE previously performed the signal measurements exceeds the period of time threshold. In such an instance, the method may further include reporting measurement metrics associated with each of the plurality of beams to the network. However, if the length of time since the UE previously performed the signal measurements is less than the period of time threshold, the method may include measuring signal quality for the last reported beam (e.g., a beam from a plurality of beams for which the UE reported measurements last) as identified in block 415 below. Aspects of block 410 may be performed by communication management component 350 described with reference to FIG. 3.

At block 415, the method 400 may include measuring, in response to the request, a signal quality for at least one beam from the plurality of beams associated with the SCell to generate a current measurement metric. In some examples, the at least one beam may be identified in the active TCI configuration when the UE is determined to be configured in an active TCI state. To this end, the method 400 may include determining that the UE is configured with an active TCI state that identifies the at least one beam from the plurality of beams. In other examples, the at least one beam may be the last reported beam for which the UE 104 may have reported the signal quality measurement metrics. Aspects of block 415 may be performed by measurement metrics component 360 described above with reference to FIG. 3. Thus, the UE 104, the processor 312, and/or the modem 314 executing the communication management component 350 or the measurement metrics component 360 or one of its subcomponents may define means for measuring, in response to the request, a signal quality for at least one beam from the plurality of beams associated with the SCell to generate a current measurement metric.

At block 420, the method 400 may include determining whether a difference between the current measurement metric and a previous measurement metric for the at least one beam satisfies a threshold. In some examples, the previous measurement metric may be a signal quality measurement that the UE may have previously reported to the network for one or more beams (e.g., from previous activation of the SCell). In other examples, the previous measurement metric may be associated with the beam identified in the active TCI configuration for the UE. Specifically, the UE may be configured in an active TCI state based on prior SCell activations that identifies a limited set of beams for the UE to use for communication on the SCell. As such, during subsequent communications (e.g., current communication), the UE may limit the measurement reporting to only those beams that had previously been assigned to the UE in the active TCI configuration.

In some examples, the determining whether the difference between the current measurement metric and the previous measurement metric for the at least one beam satisfies a threshold includes comparing the new measurement metric to an old measurement metric that the UE had previously reported to the network for the at least one beam from the plurality of beams associated with the SCell. In some examples, the threshold to trigger configuring the UE to either enable or disable the measurement reporting (see block 425) may be configured by the network by a configuration message (e.g., via signaling). Aspects of block 420 may be performed by measurement comparison component 362 described with reference to FIG. 3. Thus, the UE 104, the processor 312, and/or the modem 314 executing the communication management component 350 or the measurement comparison component 362 or one of its subcomponents may define means for determining whether a difference between the current measurement metric and a previous measurement metric for the at least one beam satisfies a threshold.

At block 425, the method 400 may include configuring the UE to either enable or disable measurement reporting based on the determining. In some examples, configuring the UE to either enable or disable measurement reporting may include disabling the measurement reporting based on determining that the difference between the new measurement metric and the old measurement metric for the at least one beam is less than the threshold. In some aspects, disabling the measurement reporting may include omitting reporting the new measurement metric for the at least one beam to the network. For example, the UE may elect not to report the new measurement report to the network if the difference between the new measurement metric and the old measurement metric previously reported has not changed significantly (e.g., less than a threshold).

In other examples, if the difference exceeds the threshold, the method may include enabling the measurement reporting based on determining that the difference between the new measurement metric and the old measurement metric for the at least one beam is greater than the threshold. In such an instance, the method may include measuring the signal quality for each of the plurality of beams associated with the SCell using beam sweep, and reporting measurement metrics associated with each of the plurality of beams to the network.

In some examples, configuring the UE to either enable or disable the measurement reporting may include enabling the measurement reporting based on a determination that the signal quality for the at least one beam from the plurality of beams falls below a signal quality threshold. For example, the measurements using beam sweep across all beams can be triggered if the single beam being monitored falls below the signal quality threshold. In other examples, the method may include enabling the measurement reporting based on a determination that a first signal quality for a first beam from the plurality of beams falls below a signal quality threshold, and a second signal quality for the second beam is greater than the signal quality threshold. For example, the UE may measure and report other beams from the SCell if the beam being monitored (e.g., beam that is configured in TCI) falls below a threshold, while another beam is better than the one being monitored by a certain signal quality threshold, where the signal quality threshold may be configured by the network. Aspects of block 425 may be performed by reporting configuration component 370 described above with reference to FIG. 3. Thus, the UE 104, the processor 312, and/or the modem 314 executing the communication management component 350 or the reporting configuration component 370 or one of its subcomponents may define means for configuring the UE to either enable or disable measurement reporting based on the determining.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

It should be noted that the techniques described above may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:
1. A method for wireless communications, comprising:
  receiving, at a user equipment (UE), a request from a network to perform measurement reporting by periodically reporting signal measurements for a plurality of beams associated with a secondary cell (SCell);

measuring, in response to the request, a signal quality for at least one beam from the plurality of beams associated with the SCell to generate a current measurement metric;

determining whether a difference between the current measurement metric and a previously reported measurement metric for the at least one beam is less than a threshold; and configuring the UE to disable the measurement reporting based on determining that the difference between the current measurement metric and the previously reported measurement metric for the at least one beam is less than the threshold, wherein disabling the measurement reporting includes omitting reporting the current measurement metric for the at least one beam to the network.

2. The method of claim 1, further comprising:
determining that the UE is configured with at least one transmission configuration indicator (TCI) state that identifies the at least one beam from the plurality of beams.

3. The method of claim 2, wherein the at least one beam from the plurality of beams includes a beam configured for a previously activated TCI state.

4. The method of claim 2, wherein the TCI state identifies only one beam from the plurality of beams for the UE to utilize for communication on the SCell.

5. The method of claim 1, further comprising enabling the measurement reporting based on determining that the difference between the current measurement metric and the previously reported measurement metric for the at least one beam is greater than the threshold.

6. The method of claim 5, further comprising:
measuring the signal quality for each of the plurality of beams associated with the SCell using a beam sweep; and
reporting measurement metrics associated with each of the plurality of beams to the network.

7. The method of claim 1, further comprising:
determining, in response to the request, whether a length of time since the UE previously performed signal measurements for the plurality of beams associated with the SCell exceeds a period of time threshold.

8. The method of claim 7, further comprising:
measuring the signal quality for each of the plurality of beams associated with the SCell using beam sweep based on the determining that the length of time since the UE previously performed the signal measurements exceeds the period of time threshold; and
reporting measurement metrics associated with each of the plurality of beams to the network.

9. The method of claim 7, wherein the period of time threshold is a number of periodic measurement cycles.

10. The method of claim 1, wherein the threshold for comparison to the difference is configured by the network by a configuration message.

11. The method of claim 1, further comprising enabling the measurement reporting based on a determination that the signal quality for the at least one beam from the plurality of beams falls below a signal quality threshold.

12. The method of claim 1, wherein configuring the UE to either enable or disable the measurement reporting based on the determining, comprises:
enabling the measurement reporting based on a determination that a first signal quality for a first beam from the plurality of beams falls below a signal quality threshold, and a second signal quality for a second beam is greater than the signal quality threshold.

13. An apparatus for wireless communications, comprising:
a memory configured to store instructions; and
a processor communicatively coupled with the memory, the processor configured to execute the instructions to:
receive, at a user equipment (UE), a request from a network to perform measurement reporting by periodically reporting signal measurements for a plurality of beams associated with a secondary cell (SCell);
measure, in response to the request, a signal quality for at least one beam from the plurality of beams associated with the SCell to generate a current measurement metric;
determine whether a difference between the current measurement metric and a previously reported measurement metric for the at least one beam is less than a threshold; and
configure the UE to disable the measurement reporting based on determining that the difference between the current measurement metric and the previously reported measurement metric for the at least one beam is less than the threshold, wherein disabling the measurement reporting includes omitting reporting the current measurement metric for the at least one beam to the network.

14. The apparatus of claim 13, wherein the processor is configured to execute the instructions to determine that the UE is configured with at least one transmission configuration indicator (TCI) state that identifies the at least one beam from the plurality of beams.

15. The apparatus of claim 14, wherein the at least one beam from the plurality of beams includes a beam configured for a previously activated TCI state.

16. The apparatus of claim 14, wherein the TCI state identifies only one beam from the plurality of beams for the UE to utilize for communication on the SCell.

17. The apparatus of claim 13, wherein the processor is configured to execute the instructions to enable the measurement reporting in response to determining that the difference between the current measurement metric and the previously reported measurement metric for the at least one beam is greater than the threshold.

18. The apparatus of claim 17, wherein the processor is configured to execute the instructions to:
measure the signal quality for each of the plurality of beams associated with the SCell using a beam sweep; and
report measurement metrics associated with each of the plurality of beams to the network.

19. The apparatus of claim 13, wherein the processor is configured to execute the instructions to determine, in response to the request, whether a length of time since the UE previously performed signal measurements for the plurality of beams associated with SCell exceeds a period of time threshold.

20. The apparatus of claim 19, wherein the processor is configured to execute the instructions to:
measure the signal quality for each of the plurality of beams associated with the SCell using beam sweep in response to determining that the length of time since the UE previously performed the signal measurements exceeds the period of time threshold; and
report measurement metrics associated with each of the plurality of beams to the network.

21. The apparatus of claim 19, wherein the period of time threshold is a number of periodic measurement cycles.

22. The apparatus of claim 19, wherein the threshold for comparison to the difference is configured by the network by a configuration message.

23. The apparatus of claim 19, wherein the processor is configured to execute the instructions to enable the measurement reporting in response to a determination that the signal quality for the at least one beam from the plurality of beams falls below a signal quality threshold.

24. The apparatus of claim 19, wherein the processor is configured to execute the instructions to enable the measurement reporting based on a determination that a first signal quality for a first beam from the plurality of beams falls below a signal quality threshold, and a second signal quality for a second beam is greater than the signal quality threshold.

25. An apparatus for wireless communications, comprising:

- means for receiving, at a user equipment (UE), a request from a network to perform measurement reporting by periodically reporting signal measurements for a plurality of beams associated with a secondary cell (SCell);
- means for measuring, in response to the request, a signal quality for at least one beam from the plurality of beams associated with the SCell to generate a current measurement metric;
- means for determining whether a difference between the current measurement metric and a previously reported measurement metric for the at least one beam is less than a threshold; and
- means for configuring the UE to disable the measurement reporting based on determining that the difference between the current measurement metric and the previously reported measurement metric for the at least one beam is less than the threshold, wherein disabling the measurement reporting includes omitting reporting the current measurement metric for the at least one beam to the network.

26. The apparatus of claim 25, further comprising:

means for determining that the UE is configured with at least one activated transmission configuration indicator (TCI) state that identifies the at least one beam from the plurality of beams.

27. A non-transitory computer readable medium storing computer executable code, the code when executed by a processor causes the processor to:

- receive, at a user equipment (UE), a request from a network to perform measurement reporting by periodically reporting signal measurements for a plurality of beams associated with a secondary cell (SCell);
- measure, in response to the request, a signal quality for at least one beam from the plurality of beams associated with the SCell to generate a current measurement metric;
- determine whether a difference between the current measurement metric and a previously reported measurement metric for the at least one beam is less than a threshold; and
- configure the UE to disable the measurement reporting based on determining that the difference between the current measurement metric and the previously reported measurement metric for the at least one beam is less than the threshold, wherein disabling the measurement reporting includes omitting reporting the current measurement metric for the at least one beam to the network.

\* \* \* \* \*